June 9, 1953 A. M. BENSON 2,641,659

TELEPHONE LOCK

Filed Jan. 23, 1952

Inventor:
Archie M. Benson
by Hill, Sherman, Meroni, Gross & Simpson
Attys

Patented June 9, 1953

2,641,659

UNITED STATES PATENT OFFICE 2,641,659

TELEPHONE LOCK

Archie M. Benson, North Hollywood, Calif.

Application January 23, 1952, Serial No. 267,733

2 Claims. (Cl. 179—189)

The present invention relates to a telephone lock and more particularly to a lock for a telephone of the removable hand set type wherein the hand set when mounted in the cradle of the telephone maintains a plunger or the like in a depressed position to maintain the telephone inactive.

Heretofore, no satisfactory lock has been developed for a non-dial telephone. Further, locks for the dial of a dial telephone are not altogether satisfactory inasmuch as it is possible to reach an operator without the use of the dial by lifting the hand set from its cradle and rapidly depressing the cylindrical plungers controlled thereby ten or more times.

It is therefore an important object of the present invention to provide a telephone lock which will prevent the manipulation of the cylindrical plungers and therefore maintain the telephone in inactive condition even when the handset is removed from its cradle.

Another object of the present invention is to provide a unitary locking device which will be equally applicable to dial and non-dial type telephones.

Another object of the present invention is to provide a unitary key-operated telephone lock device which is readily applied to and removed from the telephone.

Another object of the present invention is to provide a lock device comprising a standard key-operated lock and a bracket which may be formed in a simple stamping operation.

Another object of the present invention is to provide a telephone lock which is simple and compact, and inconspicuous when applied to a telephone.

The telephone lock of the present invention is particularly adapted for use with a telephone of the removable hand set type wherein the pedestal portion of the telephone contains a horizontal carrying recess for lifting and carrying this telephone from place to place and a rib extends across the upper rear margin of the recess and projecting downwardly into the recess for gripping by the fingers of the hand. Further, the telephone has a cradle for receiving the hand set and a pair of cylindrical plungers which are held depressed by the hand set when seated in the cradle to maintain the telephone inactive, but which are released upon lifting the hand set from the cradle to render the telephone active and ready for use.

According to the general features of the present invention, a lock bracket has a pair of oppositely extending lateral flanges for engaging the plungers of the telephone and a mounting flange extending from a margin of the bracket body for overlying the rear end of the horizontal recess in the pedestal portion of the telephone. A standard key operated cylindrical lock extends through the locking flange and has a locking arm which is rotatable to engage behind the carrying rib to lock the telephone bracket to the telephone.

Other objects, features and advantages of the present invention will be readily apparent from the following detailed description of a preferred embodiment thereof taken in view of the accompanying drawings, in which.

As shown on the drawings.

Figure 1:
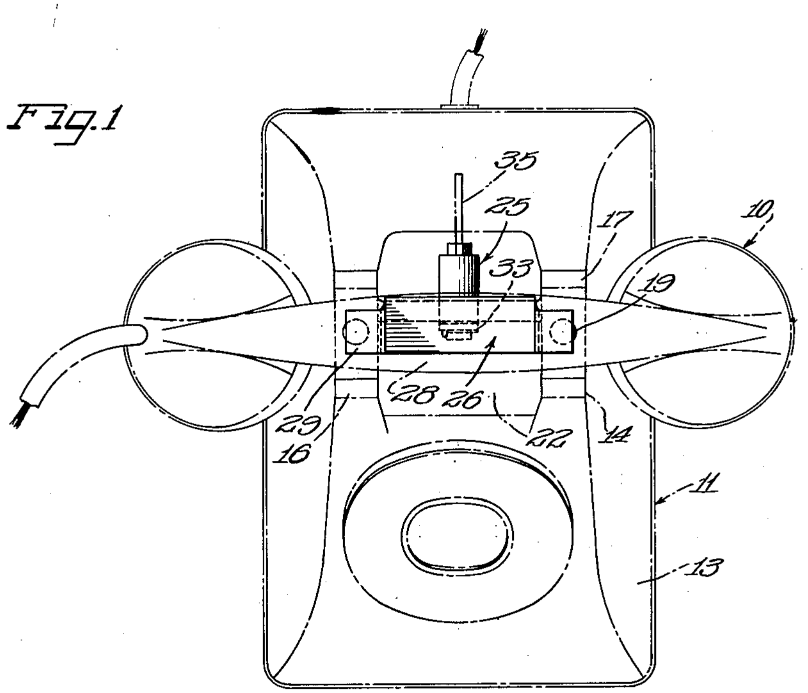
Figure 1 is a plan view of a telephone of the removable hand set type having applied thereto the key-operated telephone lock of the present invention.

A dial telephone of the removable hand set type with which the present invention is adapted to be used comprises a removable hand set generally indicated by the reference numeral 10 and the hand set mounting 11. The hand set mounting comprises a base portion 12 of generally rectangular configuration, a pedestal portion 13 and a cradle portion 14. The cradle portion is provided with two pairs of spaced upstanding tines 16, 16, 17, 17. Between each pair of tines there is mounted in the cradle a cylindrical plunger 19. In this type of instrument, when the hand set is resting on the cradle portion between the tines it acts to hold the plungers depressed and the telephone instrument inactive, while removal of the hand set from the cradle permits the plungers to rise and render the instrument ready for use.

The pedestal portion 13 is formed with a large horizontal recess 21 opening rearwardly centrally beneath the cradle portion 14. This upper wall of the recess is defined by an upper relatively thin flat wall portion 22 extending rearward and having its rear marginal edge a downwardly projecting rib or flange 23. This construction is provided so that a person desiring to remove the entire instrument from place to place may insert the fingers in the recess and about the rib 23 and thus readily lift and carry the instrument. The invention is particularly advantageously applied to this particular type of instrument illustrated which is now widely in use and which, in general, is illustrated in the patent to Kuhn et al., No. 2,096,046, issued October 19, 1937, but the invention may well be applicable to any standard form of telephone instrument.

In the specific construction illustrated, the rib or flange 23 at the mouth of the recess 21 provides an effective and suitable element with which the telephone lock of the present invention may be readily engaged and the lock in the preferred form illustrated is of the type to fit around and grip this rib.

Figures 2, 3:
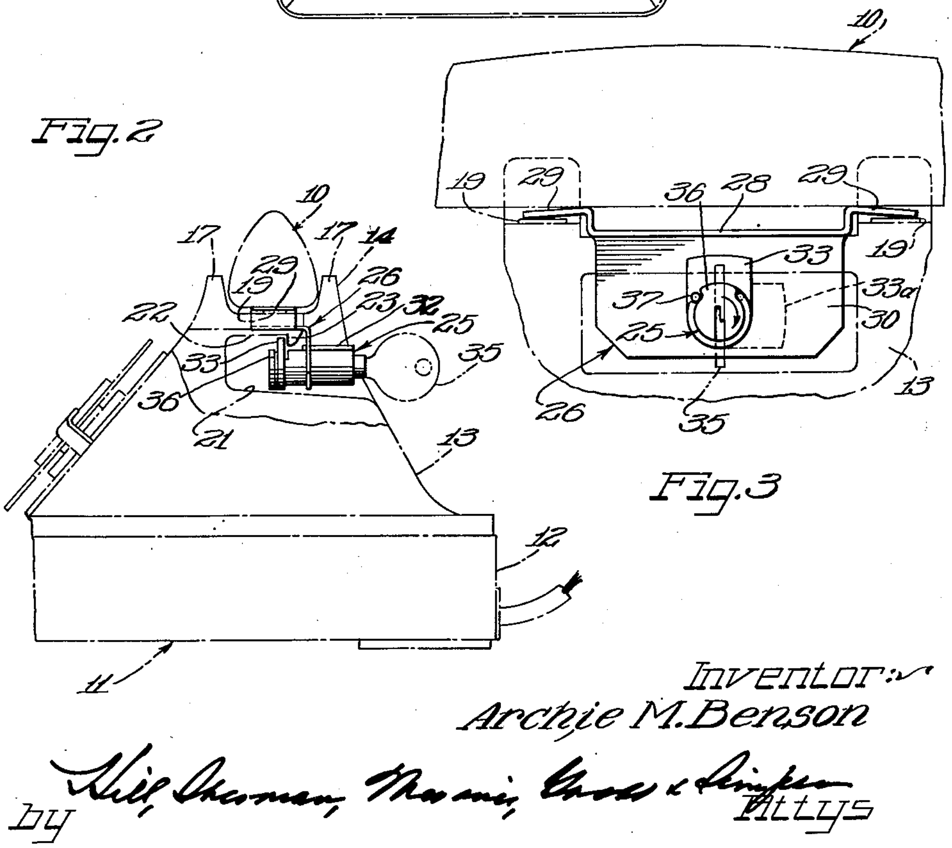
Figure 2 is a side elevational view of the structure of Figure 1 with a portion of the telephone broken away to show the telephone lock in side elevation.
Figure 3 is a transverse sectional view of the structure of Figure 1 looking to the rear as seen in Figure 1 and showing the lock in front elevation.

The device in the preferred form illustrated comprises a conventional cylindrical key-operated lock 25 rigidly secured to a lock bracket 26 by welding or the like so as to form a unitary and compact structure. The locking bracket 26 comprises a generally horizontally extending generally rectangular body portion 28 having a pair of vertically upwardly offset oppositely extending lateral flanges 29, each for opposing one of said cylindrical plungers 19 as best seen in Figure 3. The body portion 28 overlies the top of the flat wall portion 22 and has a generally rectangular mounting flange 30 depending from the rear edge thereof generally at right angles to the body portion. The mounting flange 30 thus substantially closes the rear opening of the recess 21 when the lock is mounted on the telephone and is provided with a central keyed opening for receiving the cylindrical lock member 25. The lock member 25 is provided with a key 32 which prevents rotation between the lock bracket 26 and the lock member 25. The lock member 25 carries at its end a locking arm 33 which is adapted to be moved from a horizontal non-locking position shown in dash outline at 33*a* in Figure 3 to the upright position shown in solid outline in Figures 2 and 3 wherein the arm hooks behind the rib 23 to retain the lock assembled with the telephone. A key indicated in outline at 35 is operative to rotate the lug 36 of the lock member, Figures 2 and 3, and move it against the pin 37 carried by the arm 33 to shift the arm from the operative to the inoperative position.

It will thus be apparent that I have provided a telephone lock which will positively maintain the telephone inactive when applied thereto and which is readily and simply assembled with the telephone and removed therefrom. Further, it will be understood that the locking bracket may be readily made of sheet metal and formed by means of a stamping operation. Also, the lock may utilize a conventional lock member of the key-operated type which will form a unitary and compact component of the final assembly. The lock is readily applied to the conventional telephone now current without any alterations of the telephone.

It will be understood that modifications and variations may be effected and that the device may be adapted to various type telephones without departing from the scope of the novel concepts of the present invention.

I claim as my invention:

1. An article of manufacture, in a telephone lock adapted for use with a telephone of the removable hand set type including a cradle portion having depressible plungers mounted therein, a hand set portion for seating on said cradle portion, a carrying recess opening rearwardly centrally beneath the cradle portion, and a downwardly depending rib extending across the rear margin of said recess; a locking bracket comprising a body portion, a pair of flange portions offset from the plane of said body portion and extending laterally from the transverse margins of said body portion, and a mounting flange depending from one longitudinal edge of said body portion, and a lock member extending through said mounting flange and rigidly fixed thereto and having a locking arm extending beneath said body portion to interlock with the rib of the carrying recess to retain the lock assembled with the telephone with the lateral flanges overlying and depressing the cylindrical plungers of the telephone and the mounting flange overlying the carrying recess.

2. An article of manufacture, in a telephone lock adapted for use with a telephone of the removable hand set type, the telephone including a cradle portion having depressible plungers mounted therein and a carrying recess opening rearwardly centrally beneath the cradle portion, a hand set for seating on said cradle portion, and a downwardly depending rib extending across the rear margin of the recess; a locking bracket including transversely spaced portions for overlying said cylindrical plungers and a mounting flange for overlying said rearwardly opening recess, and a lock member rigidly fixed to said mounting flange for extending into said recess and having at the inner end thereof a locking arm for movement by said lock member into a position for engaging behind said rib in said recess to retain said lock with said telephone mounting.

ARCHIE M. BENSON.

References Cited in the file of this patent

UNITED STATES PATENTS

| Number | Name | Date |
| --- | --- | --- |
| 1,439,012 | Long | Dec. 19, 1922 |
| 2,101,271 | Schreiber | Dec. 7, 1937 |
| 2,558,661 | Murray | June 26, 1951 |
| 2,588,176 | Strauch | Mar. 4, 1952 |